Sept. 1, 1925.
P. W. PRUTZMAN
1,551,909
APPARATUS FOR NEUTRALIZING OR DECOLORIZING OILS
Filed April 19, 1921
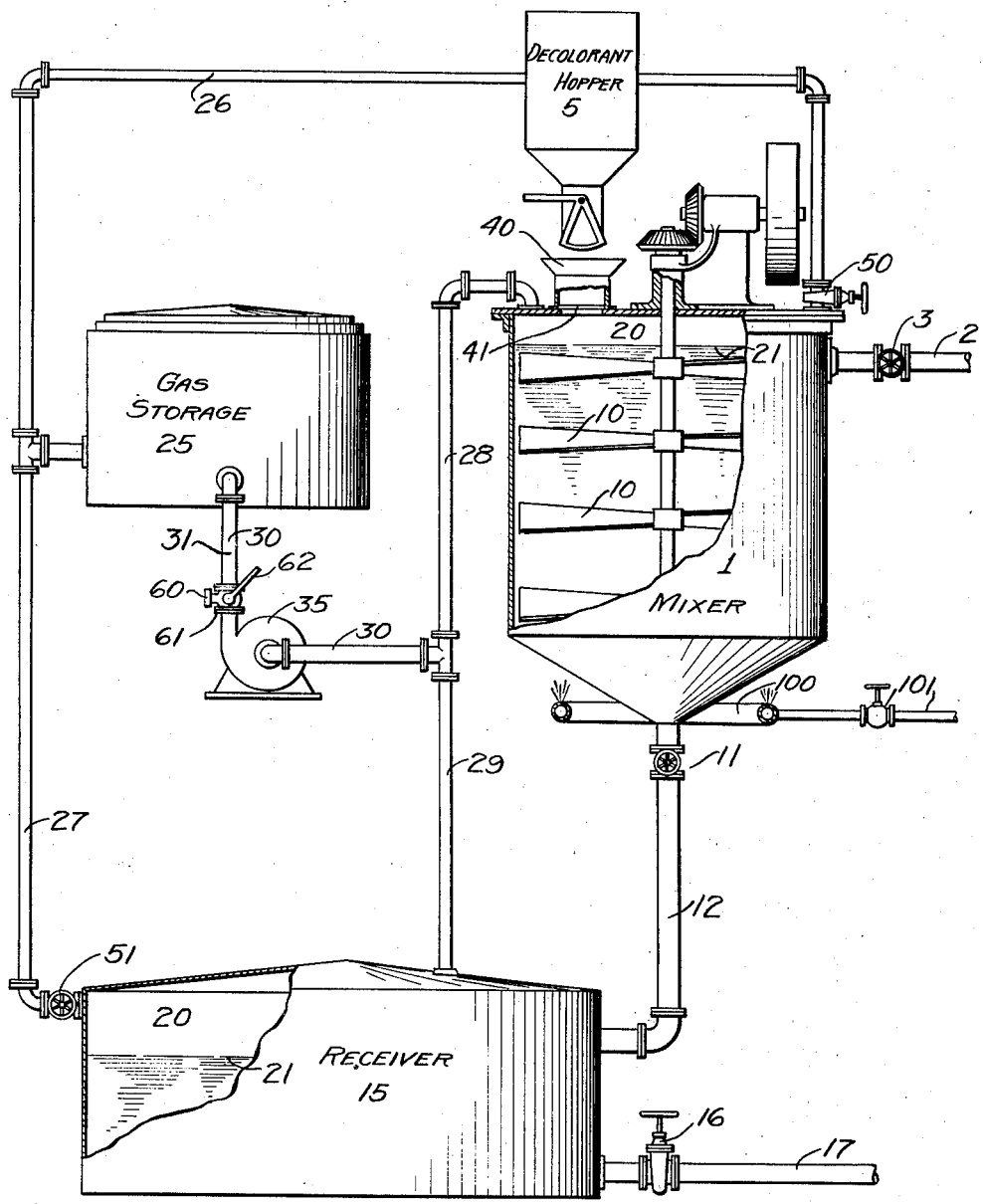
INVENTOR.
PAUL W. PRUTZMAN,
BY
ATTORNEYS.

Patented Sept. 1, 1925.

1,551,909

UNITED STATES PATENT OFFICE.

PAUL W. PRUTZMAN, OF LOS ANGELES, CALIFORNIA, ASSIGNOR TO GENERAL PETROLEUM CORPORATION, A CORPORATION OF CALIFORNIA.

APPARATUS FOR NEUTRALIZING OR DECOLORIZING OILS.

Application filed April 19, 1921. Serial No. 462,671.

*To all whom it may concern:*

Be it known that I, PAUL W. PRUTZMAN, a citizen of the United States, residing at Los Angeles, in the county of Los Angeles and State of California, have invented a new and useful Apparatus for Neutralizing or Decolorizing Oils, of which the following is a specification.

This invention relates to the treatment of oils for the removal of coloring matter or other impurities contained therein by subjecting them to the action of absorption agents which absorb impurities from such oils and leave an oil that is of greater commercial value than oils not having been decolorized.

Heretofore these treatments have been performed in apparatus open to the atmosphere and in such practice oxygen from the air enters into reaction with the oil and causes an appreciable darkening of the product, especially when the treatment is carried on at temperatures above those of the atmosphere; but in my process, which has for its object the treatment of oils in non-reactive atmospheres, this detrimental reaction between the oil and the oxygen is prevented by the method which I shall hereinafter fully describe.

The accompanying drawing is of a diagrammatic nature and illustrates a combination of apparatus suitable for use with my process.

In the arrangement of apparatus shown heated oil, at a temperature at which the process is customarily performed, is supplied from some exterior source to a mixer 1 through a supply pipe 2, the flow through which is controlled by a valve 3. Therein the oil is mixed with an amount of decolorant which is supplied from a hopper 5, and after thorough agitation by paddles 10, the mixture is passed through a valve 11 and a transfer pipe 12 to a receiver 15 wherein the decolorant is allowed to fully function and the mixture allowed to cool to the temperature of the atmosphere before being delivered through a valve 16 and a pipe 17 to filter presses or other desirable means of separation.

During this entire process air is excluded from both the mixer 1 and the receiver 15 by displacing the air that would otherwise occupy the spaces 20 above the oil levels 21 with a non-reactive gas, such as carbon dioxide, which is supplied through pipes 26 and 27 from a container 25 and constant circulation is maintained through pipes 28 and 29 connected to a line 30 in which is located a blower 35. The decolorant material is added through a feed spout 40 which is provided with a gate 41 adapted to be closed after the admission of the decolorant material to the mixing chamber, thereby forming a practically tight compartment in which to treat the oil for the extraction of the undesirable coloring matter therein contained.

It is desirable at the beginning of a period of operation to displace the air contained within the chambers of the different apparatus with the non-reactive gas so that the oil charges allowed to enter the chambers will not at any time be subjected to the oxidizing influence of air. This may be accomplished by opening valves 50 and 51 in the lines 26 and 27 to allow the free passage of the gas into the chambers, and exhausting the air contained in said chambers by use of the blower 35 and delivering the air into the open through a port 60 of a three-way valve 61 situated in that portion 31 of the line 30 which leads from the blower 35 to the container 25. When the air content is entirely discharged from the different apparatus, as may be determined by the discontinuance of the flow of air through the port 60 and the appearance of gas instead thereof, the control lever 62 of valve 61 is actuated and the flow of gas is directed through the piping 31 into the gas container 25, and the continued action of the blower 35 keeps the gas in constant circulation throughout the different chambers of the apparatus. The oil then allowed to enter the mixer 1 is subjected only to the presence of the non-reactive gas and any deterioration due to oxidation is thereby prevented. As it is preferable to use a non-reactive gas that is heavier than air the opening of gate 41 to admit the decolorant will not be accompanied by an inrush of air as the greater weight of the gas as compared to that of the air will effectually resist its displacement.

As the agitated product of the mixer 1 is discharged into the receiver 15 and rises within the receiver the gas occupying the lower portion thereof is displaced and a protecting layer or seal is formed above the mixture level 21, and the gas is continued in circulation by the blower 35 through the space 20 unoccupied by the mixture while the mixture is being thoroughly acted upon by the decolorant and is allowed to cool to a temperature at which the oil is non-reactant with oxygen before being exposed to the air.

In some cases in place of supplying the oil in heated form, it is heated in the container by a burner 100 supplied with fuel through a pipe 101.

I claim as my invention:

An apparatus for subjecting oils to the action of adsorbent materials, at temperatures at which the oils would oxidize if exposed to the air, comprising: a container; means to heat said container; means for introducing the desired adsorbent material into said oil; agitating means for mixing the adsorbent with the oil; and means for excluding oxygen from said container by the introduction of a non-oxidizing and incombustible gas, said last mentioned means including a pump, a storage tank for a non-oxidizing gas, and means by which said pump may draw gas from the storage tank and deliver it to said contents at the top thereof.

In testimony whereof, I have hereunto set my hand at Los Angeles, California, this 13th day of April, 1921.

PAUL W. PRUTZMAN.